United States Patent [19]

Enjo et al.

[11] 4,428,854

[45] Jan. 31, 1984

[54] ABSORPTION REFRIGERANT COMPOSITIONS FOR USE IN ABSORPTION REFRIGERATION SYSTEMS

[75] Inventors: Naonori Enjo, Suita; Hideki Aomi, Osaka, both of Japan

[73] Assignee: Daikin Kogyo Co., Ltd., Osaka, Japan

[21] Appl. No.: 441,773

[22] Filed: Nov. 15, 1982

Related U.S. Application Data

[63] Continuation of Ser. No. 209,251, Nov. 21, 1980, abandoned.

[30] Foreign Application Priority Data

Nov. 30, 1979 [JP] Japan .................... 54-156093

[51] Int. Cl.$^3$ .............................................. C09K 5/04
[52] U.S. Cl. ........................................ 252/69; 252/67; 252/364; 62/112
[58] Field of Search .............. 203/44, 67; 204/62; 252/67, 69, 364; 570/134, 175, 112; 62/112

[56] References Cited

U.S. PATENT DOCUMENTS

| | | | |
|---|---|---|---|
| 2,035,541 | 3/1936 | Fleisher | 252/69 |
| 2,149,937 | 3/1937 | Copley | 62/112 |
| 3,085,065 | 4/1963 | Kvalnes | 252/67 |
| 3,607,755 | 9/1971 | Murphy et al. | 252/67 |
| 3,819,493 | 6/1974 | Fozzard | 203/70 |
| 4,155,865 | 5/1979 | Ostrozynski et al. | 252/67 |

OTHER PUBLICATIONS

Buffington, R. M., "Qualitative Requirements for Adsorbents–Refrigerant Combinations," Refrigeration Engineering, vol. 57, pp. 343–345, 384, 6, 8.

Hainsworth, W. R., "Refrigerants & Absorbents," Parts I & II, Refrigerating Engineering, vol. 48, Aug. 1944 (No. 2), Sep. 1944, pp. 97–100.

*Primary Examiner*—P. E. Willis, Jr.
*Attorney, Agent, or Firm*—Larson and Taylor

[57] ABSTRACT

An absorption refrigerant composition for use in absorption refrigeration systems comprising 1,1,1,2-tetrafluoroethane and an organic solvent capable of dissolving the ethane.

2 Claims, No Drawings

ABSORPTION REFRIGERANT COMPOSITIONS FOR USE IN ABSORPTION REFRIGERATION SYSTEMS

This is a continuation of application Ser. No. 209,251 filed Nov. 21, 1980, now abandoned.

This invention relates to absorption refrigerant compositions for use in absorption refrigeration systems.

The refrigerant compositions of this invention are useful for absorption refrigeration cycles in which heat energy of wide temperature range is used as the heat source. Generally absorption refrigeration cycles are provided by a closed circuit including an evaporator in which an absorption refrigerant composition comprising a refrigerant and a solvent is heated to cause the refrigerant only to vaporize. The refrigerant gas is led into a condenser, in which the gas is cooled from outside and thereby liquefied. The liquid refrigerant is then passed through an expansion valve, whereupon the refrigerant expands to have a reduced temperature. On absorbing heat from outside, the refrigerant vaporizes, thus producing refrigeration. The refrigerant vapor having low temperature is absorbed by and dissolved in the solvent having a reduced refrigerant concentration due to the vaporization of the refrigerant in the evaporator. The resulting composition thus incorporating the refrigerant in an increased concentration is pressurized by a pump and fed to the evaporator. With the absorption refrigeration cycle, the refrigerant is circulated through a closed circuit in this way with the aid of the solvent to afford a low temperature with use of heat energy.

The refrigerant composition for use in absorption refrigeration systems must have the characteristics of: (1) having high thermal efficiency, i.e., high refrigeration capacity relative to the heat input, (2) being free of deterioration and stable even when used for a prolonged period of time, (3) being low in toxicity and combustibility to assure safety, (4) being non-corrosive to the material of the system, and (5) being capable of retaining the operating pressure at a level not lower than the atmospheric pressure always throughout the cycle.

Absorption refrigerant compositions presently used include water-lithium bromide compositions for air conditioning, and ammonia-water compositions for refrigeration. However, these compositions still remain to be improved in some of the above characteristics, i.e. (3) safety, (4) non-corrosiveness and (5) operating pressure. It is therefore desired to develop novel refrigerant compositions free of these problems.

On the other hand, research has long been made on hydrocarbon halides for use as refrigerants. Fluorine-containing hydrocarbon halides, generally called "Fron", are used for mechanical compression refrigeration cycles. The Fron-type refrigerants nevertheless are not usable as such for absorption refrigeration cycles since the mechanical compression refrigeration cycle differs greatly from the absorption refrigeration cycle. In ASHRAE JOURNAL, December 1959, B. J. Eiseman, Jr. made an evaluation as absorption refrigerants of dichloromonofluoromethane ($R21$), monochlorodifluoromethane ($R22$), monochloromonofluoromethane ($R31$), 1-chloro-2,2,2-trifluoroethane ($R133a$), dichloromethane ($R30$), 1-chloro-1,1,2,2-tetrafluoroethane ($R124a$) and 1,1,2,2-tetrafluoroethane ($R134$). According to the report, these refrigerants are generally satisfactory in respect of the foregoing characteristics (3) to (5) but are unable to fulfil the requirements (1) and (2) as to thermal efficiency and safety. Thus they are not usable as absorption refrigerants.

We have made intensive research in an attempt to provide absorption refrigerant compositions having all the desired characteristics (1) to (5) given above and found that the combination of a specific Fron, namely 1,1,1,2-tetrafluoroethane, and an organic solvent capable of dissolving the Fron provides an outstanding absorption refrigerant composition having all the characteristics (1) to (5) although the conventional Fron refrigerants are unable to fully fulfil these requirements. The present invention has been accomplished based on this novel finding.

Thus this invention relates to absorption refrigerant compositions comprising 1,1,1,2-tetrafluoroethane and an organic solvent capable of dissolving the ethane.

The absorption refrigerant compositions of this invention have all the foregoing characteristics (1) to (5) and are excellent especially in the characteristics (1) and (2). The compositions achieve higher thermal efficiency than the conventional Fron refrigerants and remain stable and free of deterioration even when used for a long-term operation. Whereas conventional absorption refrigerant compositions containing water as the refrigerant are not usable for air-cooled refrigeration systems, the present compositions are usable for such systems which can be built compactly. With use of the present compositions, refrigeration systems can be operated at a pressure higher than the atmospheric pressure and, therefore, with improved stability.

1,1,1,2-Tetrafluoroethane (hereinafter referred to as "$R134a$") used as the refrigerant of this invention is generally greater in solubility in organic solvents and heat of vaporization than conventional Fron refrigerants. This appears to give improved thermal efficiency to the refrigerant for use as an absorption refrigerant. Moreover, having good stability when dissolved in organic solvents, the refrigerant is usable for a prolonged period of time. $R134a$ is further advantageous in that it is not toxic or combustible, therefore assures safety and will not cause corrosion to the refrigeration system.

The organic solvents to be used in this invention must be those capable of dissolving $R134a$, preferably those capable of dissolving at least 35 wt.% of $R134a$ under the conditions of the temperature of 35° C. and the pressure of 2.9 kg/cm$^2$. Useful solvents are those boiling at at least 100° C., preferably at at least 140° C. Preferably such solvents should be (i) chemically stable, (ii) non-corrosive to the system, and (iii) substantially non-toxic. Preferable solvents used in this invention are N,N-dimethylformamide, N,N-dimethylacetoamide, tetramethyl urea, acetonitrile, valeronitrile, N-methylpyrrole, N-methylpyrrolidine, piperidine, N-methylpiperazine, N-methyl-2-pyrrolidone, nitromethane and like nitrogen compound type solvents; butyl ether, acetal, tetrahydrofuran, 2-methyloxorane, 2,2-dimethyl-1,3-dioxorane, oxane, 2-methyloxane, dioxane, 2,4-dimethyl-1,3-dioxane, 4-methyl-1,3-dioxane, anisole, ethyleneglycol dimethyl ether, diethyleneglycol dimethyl ether, triethyleneglycol dimethyl ether, tetraethyleneglycol dimethyl ether, methyl tetrahydrofurfuryl ether, ethyl tetrahydrofurfuryl ether, butyl tetrahydrofurfuryl ether and like ether type solvents; butyl formate, butyl acetate, butyl propionate, butyl butylate, ethyleneglycol monomethyletheracetate, ethyleneglycol monoethyletheracetate, diethyleneglycol monoethyletheracetate, ethylacetoacetate, diethyl oxalate diethyl malonate and like ester type solvents; acetone, methyl ethyl ketone, pentanone, hexanone, 4-methyl-2-pentanone, 4-methyl-3-pentene-2-on, 2-heptanone, 2-octanone, diacethyl, acetylacetone, acetonylacetone, cyclohexanone, isophorone, D-methane-3-on like ketone type solvents; 2-heptanol nonanal, p-aldehyde, furfural and like aldehyde type solvents; triethyl phosphoric triamide, hexamethyl phosphoric triamide, triethylene phosphate, triethyl phosphate and like phosphate type solvents. Among them tetraethyleneglycoldimethyleter, dimethylformamide and methyl ethyl ketone are most preferable.

The absorption refrigerant compositions of this invention usually contain at least 40 wt.%, preferably at least 45 wt.%, of $R$134A.

The present invention will be described with reference to the following example and comparison example.

EXAMPLE 1

An absorption refrigerator is operated with use of an absorption refrigerant composition of this invention comprising $R$134a and tetraethylene glycol dimethyl ether. Table 1 shows the result.

The composition of this invention is found to be free of deterioration even after about 1000-hour operation and remains stable over a prolonged period of time.

COMPARISON EXAMPLE 1

The same procedure as in Example 1 is repeated except that 1,1,2,2-tetrafluoroethane ($R$134) is used as the refrigerant. Table 1 shows the result.

TABLE 1

| Composition<br>Operating conditions | Example 1<br>$R$134a + tetraethylene glycol dimethyl ether | Comp. Ex. 1<br>$R$134 + tetraethylene glycol dimethyl ether |
|---|---|---|
| Generator | | |
| Temperature (°C.) | 111 | 111 |
| Pressure (kg/cm$^2$ · a) | 8.1 | 8.1 |
| Concn. of refrigerant (wt. %) | 26.8 | 24.4 |
| Absorber | | |
| Temperature (°C.) | 35 | 35 |
| Pressure (kg/cm$^2$ · a) | 2.9 | 2.9 |
| Concn. of refrigerant (wt. %) | 46.3 | 42.1 |
| Amount of composition circulated (kg/refrigeration ton) | 3900 | 4600 |

Table 1 shows that as compared with the conventional composition containing $R$134, the composition of this invention comprising $R$134a requires a reduced amount of circulation, therefore necessitates a smaller pumping power, achieved improved operation efficiency and consequently attains higher thermal efficiency.

We claim:

1. An absorption refrigerant composition comprising 1,1,1,2-tetrafluoroethane and at least one organic solvent selected from the group consisting of tetraethylene glycol dimethyl ether, dimethylformamide, methyl ethyl ketone, methyl tetrahydrofurfuryl ether, ethyl tetrahydrofurfuryl ether and butyl tetrahydrofurfuryl ether, said 1,1,1,2-tetrafluoroethane being present in an amount of at least 40 wt.% based on the weight of the composition.

2. An absorption refrigerant composition according to claim 1 consisting essentially of said 1,1,1,2-tetrafluoroethane and said solvent.

* * * * *